Nov. 6, 1923.
R. V. REYNOLDS
STONE FINISHED CLAPBOARD
Filed June 23, 1921
1,473,253
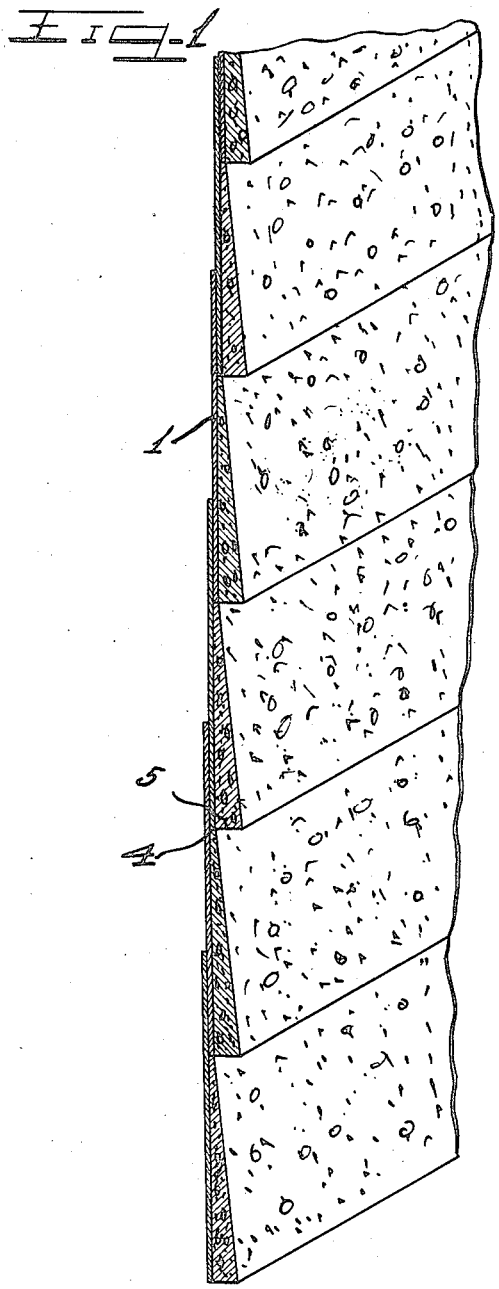
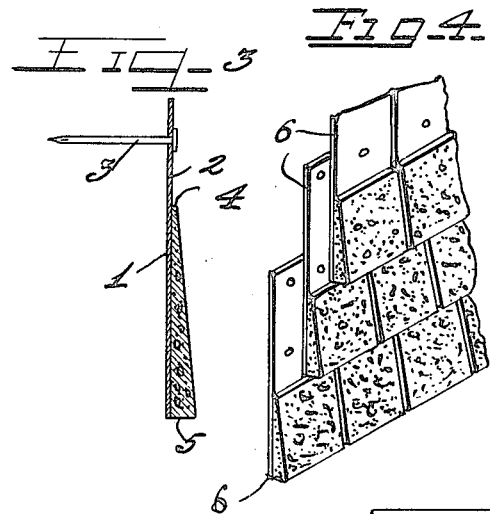
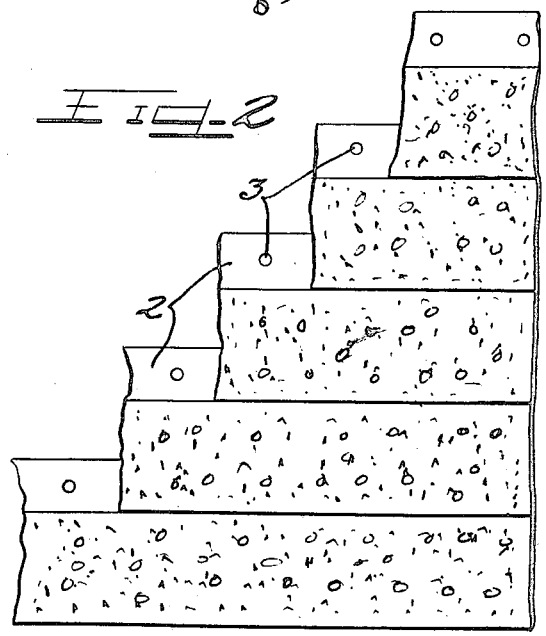
Witnesses
Inventor
RALPH V. REYNOLDS Patented Nov. 6, 1923.

1,473,253

UNITED STATES PATENT OFFICE.

RALPH V. REYNOLDS, OF CHICAGO, ILLINOIS.

STONE-FINISHED CLAPBOARD.

Application filed June 23, 1921. Serial No. 479,782.

*To all whom it may concern:*

Be it known that I, RALPH V. REYNOLDS, a citizen of the United States, and a resident of the city of Chicago, in the county of Cook and State of Illinois, have invented certain new and useful Improvements in a Stone-Finished Clapboard; and I do hereby declare that the following is a full, clear, and exact description of the same, reference being had to the accompanying drawings, and to the numerals of reference marked thereon, which form a part of this specification.

This invention relates to clap-boards such as are used for covering the sides or roofs of houses.

It is an object of this invention to provide a clap-board which shall have a foundation through which nails may be driven but shall have a surface having the character of stone.

It is a further object of this invention to produce such a compound clap-board in an inexpensive and efficient manner.

It is a further object of this invention to provide such a clap-board with a finish that shall resemble marble.

It is a further object of this invention to provide a good bond between the stone and the fibrous part of the clap-board.

Other and further objects of this invention will be apparent from the disclosures in the drawings and the accompanying specification.

The invention (in a preferred form) is shown in the drawings and hereinafter more fully described.

On the drawings:

Figure 1 is a view partly in section and partly in perspective, showing a collection of the clap-boards.

Figure 2 is a diagrammatic view showing the arrangement of the clap-boards.

Figure 3 is a section of a single clap-board.

Figure 4 is a view similar to Figure 1 of a modified construction.

As shown on the drawings:

The clap-boards consist of a foundation 1 of any suitable material, such as fibre board, thin wood, plaster board, paper, or any other material which will permit nails to be driven therethrough and to which the stone can be applied. This foundation has a part 2 which projects beyond the covered part and through which nails 3 may be driven to secure the clap-boarding to a building. The part of the foundation which is to be covered with stone is covered with an adhesive or if desired adhesive may be mixed with the artificial stone before it is applied to the foundation.

The artificial stone is made of cement and is applied to the lower part of the foundation, a shoulder 4 being formed at the upper edge of the cement. The body of cement is made tapering so that its upper edge 4 is thinner than its lower edge 5. Either at the time of applying the cement to the foundation or afterwards, stone or small pebbles, or other objects which shall give a rough exterior surface to the cement are forced into the plastic mixture. At the same time or afterwards marble dust is incorporated with the mixture or forced into the surface thereof. The cement being at this time soft, the marble dust is incorporated therewith at least to a small depth from the surface; consequently, the exterior surface of the cement will assume the looks of marble but will be rough because of the presence of the broken stone or pebbles.

If the foundation is of a material such as plaster board to which cement will readily adhere, no other adhesive need be used; but if it be of a material such as wood or builders' paper to which cement does not adhere securely, the adhesive mentioned above must be used.

When the clap-boards are hardened by the cement having set, they are applied to the building, beginning at the bottom, by driving nails through the uncovered portion of the foundation 2. Each clap-board is applied with its lower edge 5 against the shoulder 4 which constitutes the upper edge of the covering on the one below, as shown at 4 in Figure 1. The shoulder 4 is of a thickness to accommodate the thickness of the foundation 1 only, but the invention is not limited to this relative thickness, and a thicker shoulder may be provided if desired.

The clap-boards are preferably made of about the same size as clap-boards of wood now in use so that they may be bundled and sold in the same way that clap-boards are now sold. It is, however, obvious that the invention is capable of being applied to clap-boards much longer than those now used or of being applied to shingles 6 instead of clap-boards as shown in Figure 4.

I am aware that changes in construction and materials may be made without departing from the principles of this invention, and I do not purpose therefore limiting the patent granted otherwise than necessitated by the prior art.

I claim as my invention:

1. A clap-board, consisting of a fibrous foundation, and an outer layer of cement, the foundation at one edge extending beyond the layer of cement, the layer of cement being tapered toward the uncovered portion of the foundation and terminating in a shoulder.

2. A clap-board, consisting of a fibrous foundation, and an outer layer of cement, the foundation at one edge extending beyond the layer of cement, the layer of cement being tapered toward the uncovered portion of the foundation and terminating in a shoulder, the width of said shoulder being equal to the thickness of the foundation.

In testimony whereof I have hereunto subscribed my name in the presence of two subscribing witnesses.

RALPH V. REYNOLDS.

Witnesses:
  H. M. GREGG,
  M. A. WILLIAMS.